(12) United States Patent
Hiraga et al.

(10) Patent No.: US 7,509,010 B2
(45) Date of Patent: Mar. 24, 2009

(54) END-SURFACE CLOSELY ARRANGED MULTICORE OPTICAL FIBER AND MANUFACTURING METHOD THEREOF

(75) Inventors: Takashi Hiraga, Ikeda (JP); Ichiro Ueno, Ikeda (JP); Noritaka Yamamoto, Ikeda (JP); Toshiko Mizokuro, Ikeda (JP); Nobutaka Tanigaki, Ikeda (JP); Norio Tanaka, Tokyo (JP); Kuniaki Aoki, Hamamatsu (JP); Masutaka Koyano, Hamamatsu (JP); Kunio Ikuma, Hamamatsu (JP)

(73) Assignees: National Institute of Advanced Industrial Science and Technology, Tokyo (JP); Dainichiseika Color & Chemicals Mfg. Co., Ltd., Tokyo (JP)

( * ) Notice: Subject to any disclaimer, the term of this patent is extended or adjusted under 35 U.S.C. 154(b) by 0 days.

(21) Appl. No.: 11/898,720

(22) Filed: Sep. 14, 2007

(65) Prior Publication Data

US 2008/0069504 A1    Mar. 20, 2008

(30) Foreign Application Priority Data

Sep. 20, 2006  (JP)  ............... 2006-255002

(51) Int. Cl.
*G02B 6/02* (2006.01)
*G02B 6/04* (2006.01)

(52) U.S. Cl. .............. 385/126; 385/115; 385/121; 385/123

(58) Field of Classification Search ........... 385/126
See application file for complete search history.

(56) References Cited

U.S. PATENT DOCUMENTS 3,912,362 A * 10/1975 Hudson ............... 385/54
4,519,826 A * 5/1985 Tran ................... 65/397
4,932,747 A * 6/1990 Russell et al. ........... 385/115
5,064,267 A * 11/1991 Rossberg ............... 385/50
5,138,677 A * 8/1992 O'Shaughnessy et al. .... 385/43
5,222,180 A * 6/1993 Kuder et al. ............ 385/115
5,353,365 A   10/1994 Dumas et al.

(Continued)

FOREIGN PATENT DOCUMENTS

DE    10 2004 006 932 B3    10/2005

(Continued)

OTHER PUBLICATIONS

Excerpt from "Optical Fiber Communication Guide," issued on Feb. 20, 2003 by Ohmsha Ltd., p. 10-12 and 179-181.

*Primary Examiner*—Michelle R Connelly Cushwa
*Assistant Examiner*—Rhonda S Peace
(74) *Attorney, Agent, or Firm*—Oliff & Berridge, PLC (57) ABSTRACT

In an end surface closely arranged multicore optical fiber 200, at least two single-mode optical fibers 10 are, at one and the other ends of the individual single-mode optical fibers 10, closely arranged in parallel to each other and bound together, such that a center-center distance of adjacent single-mode optical fibers 10 is twice a core diameter of the single-mode optical fiber 10 or greater and 0.5 times a value obtained by subtracting the core diameter of the single-mode optical fiber from a core diameter of a multimode optical fiber to be connected or less, and that the remaining individual single-mode optical fibers 10 are individually independent from each other.

7 Claims, 6 Drawing Sheets

U.S. PATENT DOCUMENTS

| | | | |
|---|---|---|---|
| 5,394,492 A * | 2/1995 | Hwang | 385/33 |
| 5,408,556 A * | 4/1995 | Wong | 385/48 |
| 5,748,820 A * | 5/1998 | Le Marer et al. | 385/76 |
| 6,542,675 B1 * | 4/2003 | Tourgee et al. | 385/115 |
| 6,629,784 B1 * | 10/2003 | Bricheno et al. | 385/96 |
| 2004/0240489 A1 * | 12/2004 | Teramura et al. | 372/6 |

FOREIGN PATENT DOCUMENTS

| | | |
|---|---|---|
| EP | 1 191 372 A2 | 3/2002 |
| JP | B2-2781710 | 5/1998 |
| JP | A-2007-225825 | 9/2007 |
| JP | A-2007-225826 | 9/2007 |
| JP | A-2007-225827 | 9/2007 |
| WO | WO 2007/099979 A1 | 9/2007 |

* cited by examiner

END-SURFACE CLOSELY ARRANGED MULTICORE OPTICAL FIBER AND MANUFACTURING METHOD THEREOF

CROSS-REFERENCE TO RELATED APPLICATION

This application is based on and claims priority under 35 USC 119 from Japanese Patent Application No. 2006-255002, filed on Sep. 20, 2006.

BACKGROUND

1. Technical Field

The present invention relates to a closely arranged multicore optical fiber for use in a thermal lens type optically controlled optical switch in the field of optical communication and optical information transmission.

2. Related Art

General single-mode optical fibers include a core and a clad having different refractive indexes in such a structure that the core formed of a core member having a relatively higher refractive index is surrounded by the clad formed of a clad member having a relatively lower refractive index. Accordingly, the cross section of the core has a circular shape and that of the clad has a doughnut shape. Further, "holey fibers" formed by "air-holes" (having an extremely low refractive index) surrounding the periphery of the substantial portion of the core through which light travels, rather than the fibers using a clad and a core having different refractive indexes, have been developed. In both the core/clad single mode optical fiber and the holey fiber, the diameter of the core portion through which light transmits is approximately several μm to 10 μm, whereas the outer diameter or the diameter of a whole single optical fiber is normally 100 μm or more. (See "Beginners Guide to Optical Fiber Communication (revised $3^{rd}$ edition)" by Yasuharu SUEMATSU and Kenichi IGA, Ohmusha, 1989.) These diameters are determined so as to maintain the strength of the fibers for preventing disconnection from the manufacturing viewpoint, rather than under optical requirements. If the optical fiber is manufactured with extreme care, the diameter of a single optical fiber could be reduced to approximately 80 μm.

On the other hand, in the field of optical communication and optical information transmission, a "multicore (multi-wire) optical fiber" generally refers to an optical fiber formed of a simple bundle of general optical fibers. In general, a multicore optical fiber in which each fiber includes clad with a diameter of 125 μm is being widely used, both in a single-mode and a multimode. Japanese Patent No. 2781710 discloses, in the specification, a manufacturing method of a multi-waveguide type cylindrical optical conductor for a communication cable, with a view to improving a compact optical cable and providing a manufacturing method which facilitates manufacture of a multi-waveguide type cylindrical optical conductor for a communication cable. Specifically, the conductor includes a plurality of cylindrical base optical fibers buried within a cylindrical silica block, each cylindrical base optical fiber being formed of a core and a clad, and all the cores of the base optical fibers are regularly arranged on a generatrix of a cylindrical body having an axis in common with the cylindrical block. The manufacturing method includes the following steps: forming a preform from a cylindrical silica rod, together with a plurality of cylindrical base preforms, in which the cylindrical silica rod has a plurality of grooves running along the generatrix on the outer surface thereof, each of the cylindrical base preforms is formed of core glass surrounded by cladding glass and is partially housed within the cylindrical silica rod, and the preform includes the base preforms in the number corresponding to the number of base fibers to be formed and has the same shape as that of the conductor to be manufactured; applying silica particles to the preform formed in this method using a plasma technology covering method, to give the preform a uniform cylindrical outer surface shape; and performing wiredrawing with respect to an assembly thus obtained to obtain the conductor having the base fibers buried in the silica block. The specification further describes that the transverse dimension of the base preform is selected such that the base fibers each including a core having a diameter of approximately 8 μm to 10 μm and a clad having an outer diameter in the range between 25 μm and 35 μm can be obtained after wiredrawing of the fibers. In the multicore optical fiber (referred to as a "multiguide cylindrical conductor" in the specification of JP 2781710 B) manufactured by the above method, which is manufactured with the base fibers being bound together at both ends as is obvious from the manufacturing method, it is practically impossible to handle the individual optical fibers (a waveguide cylindrical optical conductor) independently at one end, e.g. to connect each of the individual fibers to a single optical fiber separately.

The present inventors disclose, in PCT/JP2007/053707, that a plurality of adjacent single-mode optical fibers are closely arranged in parallel to each other and bound together, with the distance between centers of the adjacent optical fibers being no greater than a predetermined value (approximately 40 μm) at one end, and control light is caused to emit from one end and signal light is caused to emit from the other end, thereby allowing an extremely efficient operation of a thermal lens type optically-controlled optical path deflection switch.

The present invention advantageously provides an end surface closely arranged multicore optical fiber and a manufacturing method thereof, in which at least two core/clad single mode optical fibers including a clad surrounding the outer periphery of a core are closely arranged in parallel to each other and bound together at least at one end of the individual single mode optical fibers, with the core diameter being maintained and the outer diameter of the clad being reduced, and the individual optical fibers are individually independent at the other end of the individual optical fibers. With the above structure, the individual optical fibers (waveguide cylindrical optical conductors) are bound together at least at one end, and, at the other end, are handled individually and separately, e.g., can be individually connected to separate single optical fibers.

SUMMARY

An end surface closely arranged multicore optical fiber and a manufacturing method thereof according to the present invention has the following features:

(1) According to an aspect of the invention, at least two core/clad single-mode optical fibers including a clad surrounding a core are, at one end of individual single-mode optical fibers, closely arranged in parallel to each other and bound together, with a core diameter being maintained and an outer diameter of the clad being reduced, and at the other end of the optical fibers, the individual single-mode optical fibers are individually independent from each other.

(2) According to another aspect of the invention, at least two core/clad single-mode optical fibers including a clad surrounding a core are, at one end of individual single-mode optical fibers, closely arranged in parallel to each other and bound together, with a core diameter being maintained and an outer diameter of the clad being reduced, and at the other end of the optical fibers, a part of the individual single-mode optical fibers are closely arranged in parallel to each other and bound together, with a core diameter being maintained and an outer diameter of the clad being reduced, and the remaining individual single-mode optical fibers are individually independent from each other.

(3) According to still another aspect of the invention, a method of manufacturing an end surface closely arranged multicore optical fiber includes: molding a core/clad single-mode optical fiber including a clad surrounding an outer periphery of a core such that, at least one end of the optical fiber, a core diameter is maintained and an outer diameter of the clad is reduced; and binding a plurality of single-mode optical fibers together at an end where the clad diameter is reduced, and inserted and fixed in a ferrule.

(4) According to a further aspect of the invention, in the above-described end surface closely arranged multicore optical fiber (1) or (2), when at least one end of the end surface closely arranged multicore optical fiber, where the single-mode optical fibers are molded with the clad diameter being reduced and are converged, is to be optically connected with a multimode optical fiber, a distance L between centers of adjacent single-mode optical fibers at the end where the clad diameter is reduced is as follows:

a lower limit distance L is twice the core diameter of the single-mode optical fiber or greater; and assuming that D represents the core diameter of the multimode optical fiber, d represents the core diameter of the single-mode optical fiber, and n is a number (2, 3, 4, or 7) of the single-mode optical fibers that are bound together, an upper limit L is as follows:

$L \leq D-d$, when $n=2$;

$L \leq \sqrt{3}(D-d)/2$, when $n=3$;

$L \leq \sqrt{2}(D-d)/2$, when $n=4$; and $L \leq (D-d)/2$, when $n=7$.

(5) According to another aspect of the invention, in the above-described end surface closely arranged multicore optical fiber (1) or (2), when signal light is emitted into one single-mode optical fiber disposed at the center of the end surface closely arranged multicore optical fiber and control light is emitted into one of peripheral single-mode optical fibers of the end surface closely arranged multicore optical fiber to thereby perform optical path switching for the signal light, a distance between centers of adjacent single-mode optical fibers at the end where the clad diameter is reduced is twice the core diameter of the single-mode optical fiber or greater and is 40 μm or less.

(6) According to a further aspect of the invention, in the above-described end surface closely arranged multicore optical fiber (1) or (2), the clad diameter is identical at the end where the clad diameter is reduced, and adjacent single-mode optical fibers in the number M represented by the following equation [1] form a closest-packing structure at the end where the clad diameter is reduced:

$$M = 1 + \sum_{n=1}^{N} 6n \quad [1]$$

where N is an integer of 1 or greater.

According to the present invention, the above structure enables handling of the individual single-mode optical fibers (waveguide cylindrical optical conductors) independently, e.g. connection of the individual fibers to separate single optical fibers, at one end. Further, with the use of an end surface closely arranged multicore optical fiber in which the individual single-mode optical fibers are independent, control light can be caused to emit from one optical fiber and signal light can be caused to emit from another adjacent optical fiber, thereby allowing extremely efficient operation of a thermal lens type optically-controlled optical path deflection switch.

BRIEF DESCRIPTION OF THE DRAWINGS

Exemplary embodiments of the present invention will be described in detail based on the following figures, wherein.

DETAILED DESCRIPTION

Preferred embodiments of the present invention will be described in detail with reference to the accompanying drawings.

First Embodiment

Figure 1:
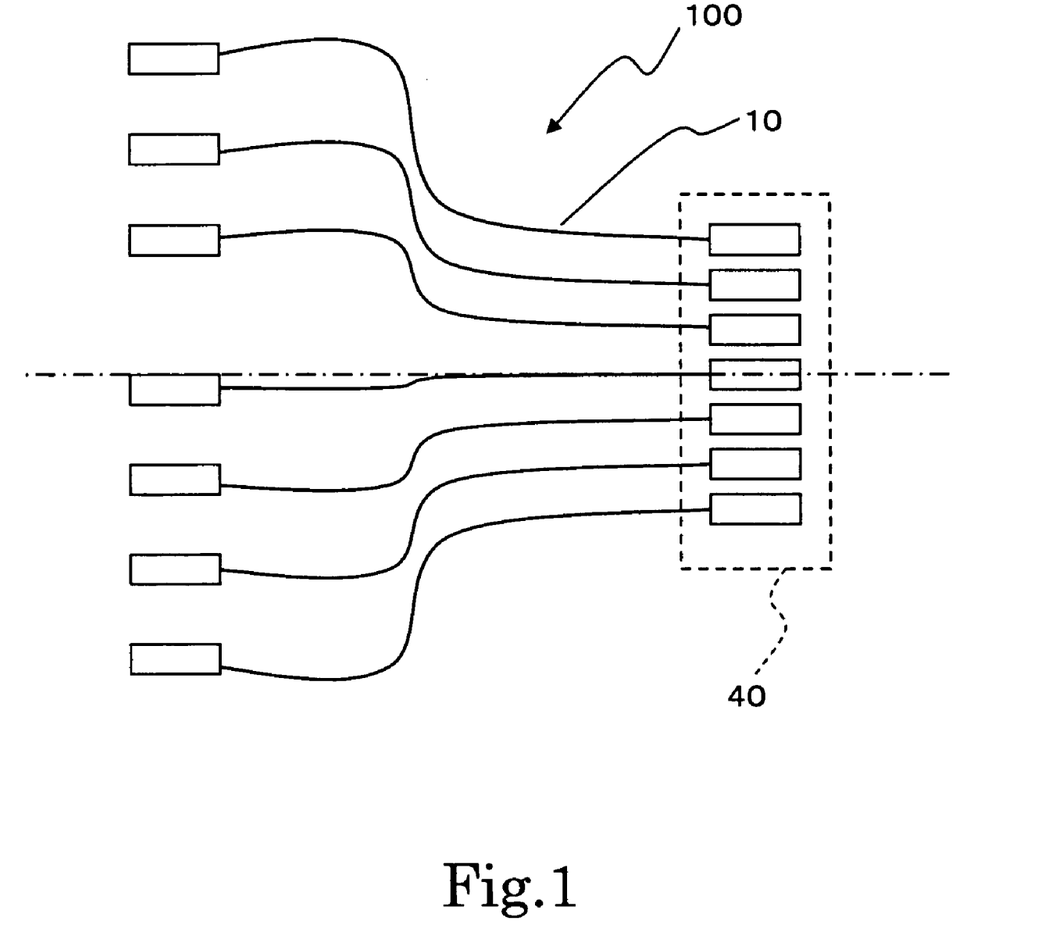
FIG. 1 is a view schematically showing a structure of an end surface closely arranged multicore optical fiber according to a first embodiment of the present invention.

FIG. 1 schematically shows an example structure of an end surface closely arranged multicore optical fiber 100 according a first embodiment of the present invention. In this structure, at least two core/clad single mode optical fibers 10 each including a clad surrounding the outer periphery of a core are closely arranged in parallel to each other and bound together at one end of the individual single mode optical fibers 10, with the core diameter being maintained and the outer diameter of the clad being reduced, and the individual single mode optical fibers 10 are individually independent at the other end of the individual optical fibers 10.

Further, when at least one end of the end surface closely arranged multicore optical fiber 100 in which the optical fibers are bound together with the clad diameter being reduced is optically connected with a multimode optical fiber, the distance between centers of adjacent single mode optical fibers at the end where the clad diameter is reduced is twice the core diameter of the single mode optical fiber 10 or greater and is 0.5 times the value obtained by subtracting the core diameter of the single mode optical fiber 10 from the core diameter of the multimode optical fiber to be connected or smaller.

The distance between centers of adjacent single mode optical fibers 10 is substantially the same as the diameter of the clad, and the upper and lower limits thereof is defined as follows.

It can be determined that a value obtained by subtracting a core diameter of a single-mode optical fiber from the center-center distance of adjacent single-mode optical fibers 10 and then halving the subtraction result substantially corresponds to a "clad thickness". Generally, in consideration of restrictions concerning the strength rather than the optical restrictions of the fibers and in further consideration of the requirements that the standard of a "ferrule" which is used for processing the end portions (the inner diameter of a ferrule is slightly greater than the clad diameter) should be unified for economical reasons, the clad diameter of 125 μm is most commonly used for both single-mode and multimode optical fibers. As this value is much greater than the core diameter (several μm to ten and several μm) of a single-mode optical fiber, it generally satisfies the optical restrictions automatically. On the other hand, with regard to the minimum size of the clad diameter with respect to the core diameter of a single-mode optical fiber based on the optical requirements, there is a restriction that, in terms of wave optics, the distribution of an electric field of light traveling within the core must satisfy a phenomenon of "extending out into the clad portion" (see page 24 of the above-described reference by Suematsu et al.) In addition, when the clad diameter is reduced to a value which is less than the normal diameter of 125 μm, the whole fiber is likely to warp easily due to a reduction in the strength, resulting in an increase in the propagation loss. As such, in this case, the restriction in terms of the strength becomes further significant. As a result of diligent study in consideration of these optical restrictions and restrictions concerning strength, the present inventors have found that the minimum value of the distance between centers of adjacent single-mode optical fibers 10, i.e. the minimum value approximately of the clad diameter is preferably twice the core diameter of a single-mode optical fiber (several μm to ten and several μm) or greater.

On the other hand, the upper limit of the center-center distance of adjacent single-mode optical fibers 10 is defined by the restrictions concerning applications of the multicore optical fiber of the present invention. Specifically, in the following applications, the requirements that the center-center distance of the single-mode optical fibers 10 should be as close to each other as possible are conspicuous.

(1) A plurality of adjacent single-mode optical fibers are closely arranged in parallel to each other and bound together at one end of the optical fibers, with a distance between centers of adjacent optical fibers being a predetermined value, "approximately 40 μm", or less, and control light is caused to be emitted from one end and signal light is caused to be emitted from the other end. With this structure, an extremely effective operation of a thermal lens type optically-controlled optical path deflection switch can be achieved (PCT/JP2007/053707). In this case, the upper limit of the center-center distance of the adjacent single-mode optical fibers 10 is 40 μm.

(2) A plurality of adjacent single-mode optical fibers are closely arranged in parallel to each other and bound together at one end of the optical fibers, with a distance between centers of adjacent optical fibers being a predetermined value, "60 μm to 80 μm", or less, and are brought into intimate contact with an end face of a normal multimode optical fiber (the core diameter is approximately 60 μm to 80). With this structure, light transmitting through plural kinds of single mode optical fibers can be combined within the multimode optical fiber with high efficiency. In such a case, the upper limit of the center-center distance of the adjacent single-mode optical fibers 10 is preferably 0.5 times a value obtained by subtracting the core diameter of the single mode optical fiber 10 from the core diameter of the multimode optical fiber to be connected or less.

However, because the clad diameter of a normal single-mode optical fiber which is commercially available is 125 μm as described above, according to the present invention, the clad diameter is reduced by the method which will be described below.

A specific example will be described with reference to FIG. 1. In the end surface closely arranged multicore optical fiber 100 shown in FIG. 1, at least two core/clad single-mode optical fibers 10 each including a clad surrounding an outer periphery of a core are closely arranged in parallel to each other and bound together at one end of the individual single-mode optical fibers 10, with the core diameter being maintained and the outer diameter of the clad being reduced, and with a distance between centers of adjacent single-mode optical fibers 10 being twice the core diameter or greater and 80 μm or less, and the individual optical fibers 10 are individually independent of each other at the other end of the individual optical fibers.

In the present embodiment, the core diameter is in a range of 2 μm to ten and several μm, depending on the wavelength. Here, it should be noted that the core diameter is similarly in the above-described range in the second embodiment which will be described below.

When the center-center distance of adjacent single-mode optical fibers 10 is less than twice the core diameter, loss of light propagating within the core is increased. When the center-center distance of adjacent single-mode optical fibers 10 exceeds 80 μm, on the other hand, the existing optical fibers can be utilized and thus the advantages of the present invention cannot be achieved. While the clad diameter is generally 125 μm due to the requirements for mechanical strength during the manufacture as described above, in the present invention, the clad diameter is reduced using the following method.

The end surface closely arranged multicore optical fiber 100 described above can be manufactured in such a manner that the core/clad single mode optical fibers 10 are molded with the core diameter of the optical fiber 10 being maintained and the outer diameter of the clad being twice the core diameter and 80 μm or less at one end of the optical fibers 10 and that a plurality of single-mode optical fibers 10 are, at the one end where the clad diameter is twice the core diameter and 80 μm or less, bound together and inserted and fixed in a ferrule. With this manufacturing method, at one end of the end surface closely arranged multicore optical fiber 100, the distance between centers of adjacent single-mode optical fibers 10 is twice the core diameter or greater and 80 μm or less.

Here, when the clad diameter at one end of the single-mode optical fibers 10 which are bound together is less than twice the core diameter, loss of light propagating within the core is increased. When the clad diameter at this end exceeds 80 μm, on the other hand, the existing optical fibers can be utilized and thus the advantages of the present invention cannot be achieved.

More specifically, in the end surface closely arranged multicore fiber 100 shown in FIG. 1, at least two, specifically seven or more in FIG. 1, single-mode optical fibers 10 are closely arranged in parallel to each other and bound together at one end of the optical fibers 10, with the center-center distance of adjacent single-mode optical fibers 10 being twice the core diameter or greater and 80 μm or less, specifically 40 μm or less in FIG. 1, and the individual single-mode optical fibers 10 are individually independent at the other end.

Here, when the center-center distance of adjacent single-mode optical fibers 10 exceeds 80 μm, the outer diameter of the multicore optical fiber increases, which may result in limitation of application of the multicore optical fiber 100.

Figure 8:
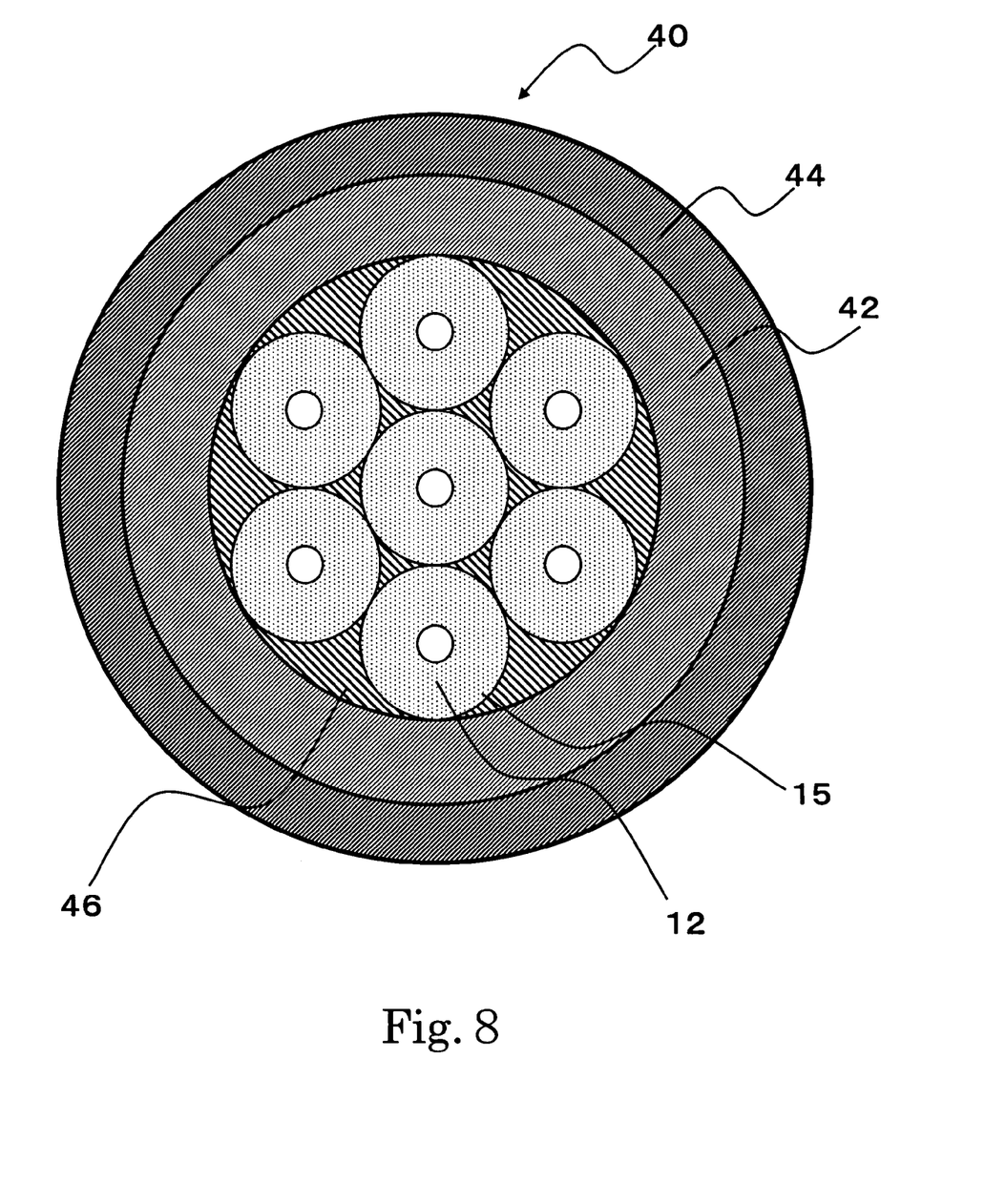
FIG. 8 is a cross sectional view taken along line A-A' of FIG. 7.

The end surface closely arranged multicore optical fiber 100 described above can be manufactured in such a manner that the single mode optical fibers 10 are molded with the clad diameter being twice the core diameter and 80 μm or less, specifically 40 μm or less in FIG. 1, at least at one end of the optical fibers 10 and that a plurality of single-mode optical fibers 10 are, at the one end where the clad diameter is 40 μm, bound together and inserted into a ferrule 40 and fixed with an adhesive resin 46, as shown in FIG. 8. For the adhesive resin, normal epoxy resin type adhesive, for example, can be preferably used.

Here, as described above, when the clad diameter of the single-mode optical fibers 10 which are bound together at one end is less than twice the core diameter, a disadvantage of increased loss of light propagating within the core is caused. When the clad diameter at this end exceeds 80 μm, on the other hand, the outer diameter of the multicore optical fiber is increased, which may result in limitation of the applications.

Second Embodiment

Figure 2:
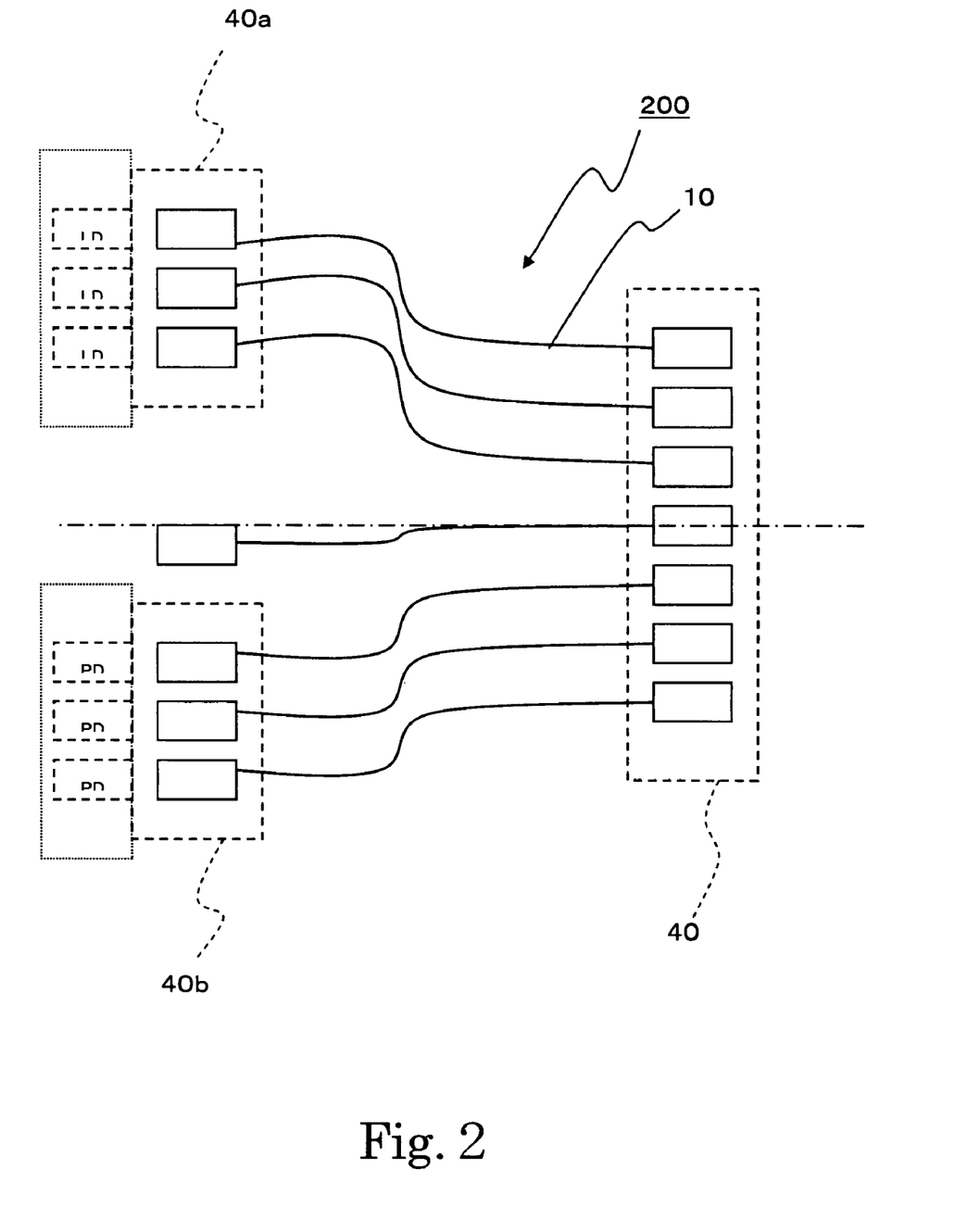
FIG. 2 is a view schematically showing a structure of an end surface closely arranged multicore optical fiber according to a second embodiment of the present invention.

FIG. 2 schematically shows an example structure of an end surface closely arranged multicore optical fiber 100 according a second embodiment of the present invention. In this structure, as shown in FIG. 2, at least two core/clad single mode optical fibers 10 each including a clad surrounding the outer periphery of a core are closely arranged in parallel to each other and bound together at one end of the individual single mode optical fibers 10, with the core diameter being maintained and the outer diameter of the clad being reduced, and, at the other end of the individual single mode optical fibers 10, some the optical fibers 10 are similarly arranged closely in parallel to each other and bound together, with the core diameter being maintained and the outer diameter of the clad being reduced, and the remaining individual single-mode optical fibers 10 are individually independent from each other.

Further, when at least one end of the end surface closely arranged multicore optical fiber 200 in which the clad diameter is reduced is optically connected with a multimode optical fiber, the distance between centers of adjacent single mode optical fibers at the end where the clad diameter is reduced is twice the core diameter of the single mode optical fiber 10 or greater and is 0.5 times the value obtained by subtracting the core diameter of the single mode optical fiber 10 from the core diameter of the multimode optical fiber to be connected or smaller.

A specific example will be described with reference to FIG. 2. In the end surface closely arranged multicore optical fiber 200 shown in FIG. 2, at least two core/clad single-mode optical fibers 10 each including a clad surrounding an outer periphery of a core are closely arranged in parallel to each other and bound together at one end of the individual single-mode optical fibers 10, with the core diameter being maintained and the outer diameter of the clad being reduced and a distance between centers of adjacent single-mode optical fibers 10 being twice the core diameter or greater and 80 μm or less. Further, at the other end of the individual single-mode optical fibers 10, some of the single-mode optical fibers 10 are similarly arranged closely in parallel to each other and bound together, with the core diameter being maintained and the outer diameter of the clad being reduced and a distance between centers of adjacent single-mode optical fibers 10 being twice the core diameter or greater and 80 μm or less, and the remaining individual single-mode optical fibers 10 are individually independent from each other.

As in the first embodiment, when the center-center distance of adjacent single-mode optical fibers 10 is less than twice the core diameter, loss of light propagating within the core is increased. When the center-center distance of adjacent single-mode optical fibers 10 exceeds 80 μm, on the other hand, the outer diameter of the multicore optical fiber is increased, which may result in limitation of the applications.

The end surface closely arranged multicore optical fiber 200 described above can be manufactured in such a manner that the core/clad single mode optical fibers 10 having a clad provided surrounding the outer periphery of a core are molded with the core diameter of the optical fiber 10 being maintained and the outer diameter of the clad being twice the core diameter and 80 μm or less at one end of the single-mode optical fibers 10, that, at the other end of the optical fibers 10, at least some of the core/clad single mode optical fibers 10 are molded with the core diameter of the optical fiber 10 being maintained and the outer diameter of the clad being twice the core diameter and 80 μm or less, and that a plurality of single-mode optical fibers 10 are, at least at one of the one end and the other end where the clad diameter is reduced, bound together and inserted and fixed in a ferrule. With this manufacturing method, at one end and/or the other end of the end surface closely arranged multicore optical fiber 200, the distance between centers of adjacent single-mode optical fibers 10 is twice the core diameter or greater and 80 μm or less.

As in the first embodiment, when the clad diameter at one end and the other end of the single-mode optical fibers 10 which are bound together is less than twice the core diameter, loss of light propagating within the core is increased. When the clad diameter at these ends exceeds 80 μm, on the other hand, the outer diameter of the multicore optical fiber is increased, which may result in limitation of applications.

More specifically, in the end surface closely arranged multicore fiber 200 shown in FIG. 2, at least two, specifically seven or more in FIG. 2, single-mode optical fibers 10 are closely arranged in parallel to each other and bound together at one end of the optical fibers 10, with the center-center distance of adjacent single-mode optical fibers 10 being twice the core diameter or greater and 80 μm or less, specifically 40 μm or less in FIG. 2, and, at the other end of the individual single-mode optical fibers 10, at least two (three in FIG. 2) single-mode optical fibers 10 are closely arranged in parallel to each other and bound together, with the center-center distance of adjacent single-mode optical fibers 10 being twice the core diameter or greater and 80 μm or less, specifically 40 μm or less in FIG. 2, and the remaining one or more (one in FIG. 1) single-mode optical fibers 10 are individually independent.

The end surface closely arranged multicore optical fiber 200 is manufactured as follows. Specifically, the single-mode optical fibers 10 are molded such that the clad diameter thereof at least at one end is twice the core diameter or greater and 80 μm or less, specifically 40 μm or less in FIG. 2, and, further, nineteen single mode optical fibers 10, for example, are bound together at the one end where the clad diameter is twice the core diameter or greater and 80 μm or less, specifically 40 μm or less in FIG. 2 and inserted and fixed in the ferrule 40. Further, the nineteen single-mode fibers 10 are also molded such that the clad diameter thereof at the other end is twice the core diameter or greater and 80 μm or less, specifically 40 μm or less in FIG. 2, and at this other end, the nineteen single-mode optical fibers 10 are bound together to form two sets of seven single-mode fibers 10, and the respective sets of seven optical fibers 10 are inserted and fixed in ferrules 40a and 40b, respectively. Meanwhile, the remaining five single-mode optical fibers are left individually independent from each other.

Here, while the number of adjacent single-mode optical fibers which are bound together at the end where the clad diameter is reduced may be any value of 2 or greater, as long as subtle warping of the optical fibers can be prevented, the resulting optical fiber is stable when the number of adjacent single-mode optical fibers is 2, 3, 4, and 7 and is unstable when the number is 5 and 6. Further, an end surface closely arranged multicore optical fiber 100 or 200 having an identical clad diameter at the end where the clad diameter is reduced and also having the tightest packing structure including the adjacent single-mode optical fibers in the number M represented by the following expression [1], in which the single-mode optical fibers are arranged closest to each other and most stably bound in the hole of the ferrule, can substantially completely eliminate the propagation loss caused by subtle warp of the optical fibers. In the following expression [1], when N is 1, 2, and 3, the numbers M of the adjacent single-mode optical fibers at the end where the clad diameter is reduced are 7, 19, and 37, respectively. FIG. 8 shows a closest packing state when M is 7.

$$M = 1 + \sum_{n=1}^{N} 6n \quad [1]$$

(N is an integer of 1 or greater)

The other end of the end surface closely arranged multicore optical fiber 200 manufactured as described above, which is inserted and fixed in the ferrule 40a, 40b, may be connected to an laser disk (LD), a phase-change disk (PD), and so on, respectively.

Third Embodiment

A multicore optical fiber of the present invention in which at least two core/clad single-mode optical fibers each having a clad surrounding the outer periphery of a core are bound at one end of the single-mode optical fibers and connected to a core of a core/clad multimode optical fiber and which is configured such that light propagating in each of the two or more single-mode optical fibers is emitted into the multimode optical fiber was manufactured according to the above-described embodiments. Specifically, seven core/clad single-mode optical fibers optimized for propagation at a wavelength of approximately 1310 nm, each having a fixed core diameter of 9.5 μm, a clad diameter of 26.5 μm at an end where the single-mode optical fibers are to be bound together, and a clad diameter of 125 μm at an end where the single-mode optical fibers are independent, were bound together at the end where the clad diameter is 26.5 μm, inserted into a ferrule having an inner diameter of 81.5 μm (which is the maximum outer diameter 79.5 μm obtained when the seven fibers each having a clad diameter of 26.5 μm are bound, with a room of 2 μm), fixed therein with an adhesive resin, and polished at the fiber ends that are bound. Here, the distance between centers of adjacent single-mode optical fibers having a core diameter of 9.5 μm and a clad diameter of 26.5 μm is 26.5 μm (which is obtained by subtracting the core diameter 9.5 μm of the single-mode optical fiber from the core diameter 62.5 μm of the multimode optical fiber and multiplying the subtraction result by 0.5).

The multicore optical fiber manufactured as described above was then brought in contact with a core portion of a core/clad multimode optical fiber having a core diameter of 62.5 μm, which is polished at the end portions and which is optimized for light propagation at the wavelength of approximately 1310 nm, such that the centers of the respective fibers are aligned, and then laser having a wavelength of 1310 nm±10 nm was caused to be emitted from each of the seven individual end portions of the multicore optical fiber of the present invention. As a result, transmission of light from the single-mode optical fiber to the multimode optical fiber could be achieved with minimum loss. Here, if the center-center distance of the single-mode optical fibers of the multicore optical fiber exceeds the value obtained by subtracting the core diameter of the single-mode optical fiber from the core diameter of the multimode optical fiber and then multiplying the subtraction result by 0.5, a portion of the core of peripheral optical fibers of the single-mode optical fibers of the multicore optical fiber would "extend" beyond the core of the multimode optical fiber, resulting in failure to achieve smooth transmission. On the other hand, when the clad diameter of the single-mode optical fiber was further reduced to thereby further reduce the center-center distance of the single-mode optical fibers, light transmission from the single-mode optical fiber to the multimode optical fiber could be achieved with minimum loss, as long as the clad diameter of the single-mode optical fiber was twice the core diameter of the single-mode optical fiber or greater. When the clad diameter of the single-mode optical fiber was less than twice the core diameter of the single-mode optical fiber, the loss of light propagating within the core was increased.

As described above, the configuration, in which seven core/clad single-mode optical fibers including a clad surrounding the outer periphery of a core, each having an identical core diameter and an identical clad diameter, are bound together at one end, and the optical fibers thus bound are connected to the core of a core/clad multimode optical fiber, and light propagating in each of the seven single-mode optical fibers is incident in the multimode optical fiber, is achieved. With regard to this configuration, by using an end surface closely arranged multicore optical fiber in which the seven single-mode optical fibers, at one end of the individual single-mode optical fibers, are closely arranged in parallel to each other and bound together, with the core diameter being maintained and the outer diameter of the clad being reduced, such that the distance between the centers of adjusting single-mode optical fibers is twice the core diameter of the single-mode optical fiber or greater, or 0.5 times the value obtained by subtracting the core diameter of the single-mode optical fiber from the core diameter of the multimode optical fiber or less, and in which the individual single-mode optical fibers, at the other end, are individually independent of each other, transmission of light from the single-mode optical fiber to the multimode optical fiber can be achieved with a minimum loss. Similar advantage can be achieved when the number of core/clad single-mode optical fibers which are bound together at one end is 2, 3, and 4, in which cases the resulting optical fiber is relatively stable. Specifically, in the structure in which two, three, and four core/clad single mode optical fibers are bound together at one end and the optical fibers thus bound are connected to a core of a core/clad multimode optical fiber and light propagating in each of the two, three and four single-mode optical fibers is incident in the multi-mode optical fiber, by using an end surface closely arranged multicore optical fiber descried below, transmission from the single-mode optical fiber to the multimode optical fiber can be achieved with minimum loss. Specifically, in the end surface closely arranged multicore optical fiber, two, three, and four single-mode optical fibers, at one end of the individual single-mode optical fibers, are arranged in parallel to each other and bound together, with the core diameter being maintained and the outer diameter of the clad being reduced, such that the distance between the centers of adjusting single-mode optical fibers is twice the core diameter of the single-mode optical fiber or greater, is equal to or less than a value obtained by subtracting the core diameter of the single-mode optical fiber from the core diameter of the multimode optical fiber when two single-mode optical fibers are bound, is equal to or less than $(\sqrt{3})/2$ times a value obtained by subtracting the core diameter of the single-mode optical fiber from the core diameter of the multimode optical fiber when three single-mode optical fibers are bound, and is equal to or less than $(\sqrt{2})/2$ times a value obtained by subtracting the core diameter of the single-mode optical fiber from the core diameter of the multimode optical fiber when four single-mode optical fibers are bound, and the individual single-mode optical fibers, at the other end, are individually independent of each other.

In summary, in an end surface closely arranged multicore optical fiber in which two, three, four, or seven optical fibers are bound together, when at least one end of the end surface closely arranged multicore optical fiber where the clad diameter is reduced and the optical fibers are converged is optically connected to a multimode optical fiber, transmission from the single-mode optical fiber to the multimode optical fiber can be achieved with minimum loss, if the center-center distance L of adjacent single-mode optical fibers at the end where the clad diameter is reduced is as follows:

the lower limit distance L is twice the core diameter of the single-mode optical fiber or greater; and the upper limit distance L is as follows:

$$L \leq D-d, \text{when } n=2;$$

$$L \leq \sqrt{3}(D-d)/2, \text{when } n=3;$$

$$L \leq \sqrt{2}(D-d)/2, \text{when } n=4; \text{and}$$

$$L \leq (D-d)/2, \text{when } n=7$$

wherein, D represents the core diameter of the multimode optical fiber, d represents the core diameter of the single-mode optical fiber, and n is a number (2, 3, 4, or 7) of the single-mode optical fibers that are bound together.

APPLIED EXAMPLE

As a multicore optical fiber of the present invention, the following was manufactured according to the embodiments described above. Specifically, seven core/clad single-mode optical fibers optimized for laser transmission at a wavelength of approximately 1550 nm and 980 nm and having a fixed core diameter of 9.5 μm, a clad diameter of 39.0 μm at an end where the single-mode optical fibers are to be bound together, and a clad diameter of 125 μm at an end where the single-mode optical fibers are independent, were bound together at the end where the clad diameter is 39.0 μm, inserted into a ferrule having an inner diameter of 119 μm (which is a hole diameter corresponding to the maximum outer diameter 117 μm obtained when the seven fibers each having a clad diameter of 39.0 μm are bound, with a space of 2 μm), fixed therein with an adhesive resin, and polished at the fiber ends that are bound. This multicore optical fiber was used to form a thermal lens type optical path switching apparatus as described in PCT/JP2007/0538707, and signal light was emitted into the center fiber of the multicore optical fiber and control light was emitted into one of peripheral optical fibers to thereby perform optical path switching. As a result, smooth optical path switching could be achieved with a high extinction ratio of 35 dB or greater.

Similarly, multicore optical fibers in each of which seven core/clad single-mode optical fibers, having a fixed core diameter of 9.5 μm, and a clad diameter of 15.2 μm, 19.0 μm, 25 μm, 35 μm, 40 μm, or 50 μm at an end where the single-mode optical fibers are to be bound together, were bound at one end were manufactured, and these multicore optical fibers were used to form thermal lens type optical path switching apparatuses as described in PCT/JP2007/0538707. Then, signal light was emitted into the center fiber of the multicore optical fiber and control light was emitted into one of the peripheral optical fibers to thereby perform optical path switching. As a result, in the apparatus in which the clad diameter at the end where the optical fibers are bound is 15.2 μm (which is 1.6 times the core diameter of 9.5 μm), loss of light propagating within the core was great and could not be used. On the other hand, the apparatuses in which the clad diameter at the end where the optical fibers are bound is 19.0 μm (which is 2 times the core diameter of 9.5 μm) or greater suffer from no problems concerning the loss of light propagating within the core. However, the apparatus in which the clad diameter at the end where the optical fibers are bound is 45 μm had a deteriorated extinction ratio for optical path switching, which was 15 to 20 dB, and was therefore unsuitable for use in optical switching. Further, thermal lens type optical switching could not also be achieved with the apparatus in which the clad diameter at the end where the optical fibers are bound is 50 μm, because vertical distance between the signal light beam and the control light beam which are adjacent to each other was too far, so that effects of the thermal lens formed by the control light did not reach the signal light.

As described above, with the use of an end surface closely arranged multicore optical fiber in which at least two core/clad single-mode optical fibers having a clad surrounding the outer periphery of a core are closely arranged in parallel to each other and bound together at one end of the individual single-mode optical fibers, with the core diameter being maintained and the clad diameter being reduced and with the distance between centers of the adjacent single-mode optical fibers being twice the core diameter or greater and 40 μm or less and in which the individual single-mode optical fibers are individually independent from each other at the other end, thermal lens type optical path switching can be achieved with a high extinction ratio.

An example method of manufacturing the end surface closely arranged multicore optical fiber of the present invention will be described with reference to FIGS. 3 to 8.

Figure 3:
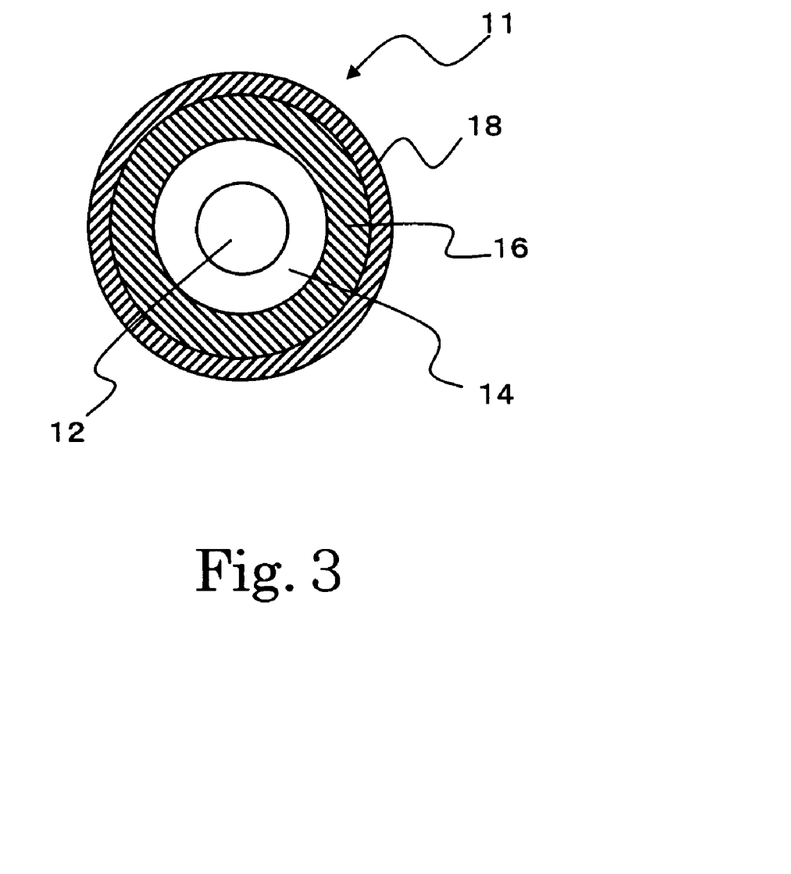
FIG. 3 is a cross sectional view of a conventional single-mode optical fiber.

Referring to FIG. 3, an example manufacturing method using a single-mode optical fiber 11 which is generally commercially available will be described. The single-mode optical fiber 11 includes a core 12 having a relatively high refractive index and having a diameter of 10 μm, a clad 14 provided surrounding the outer periphery of the core 12, having a lower refractive index than that of the core 12 and having a diameter of 125 μm, and a jacket 18 having a diameter of 0.9 mm for housing the core 12 and the clad 14, and a buffer layer 16 provided between the clad 14 and the jacket 18, formed of a resin or the like, and having a thickness of 0.4 mm.

Figure 4:
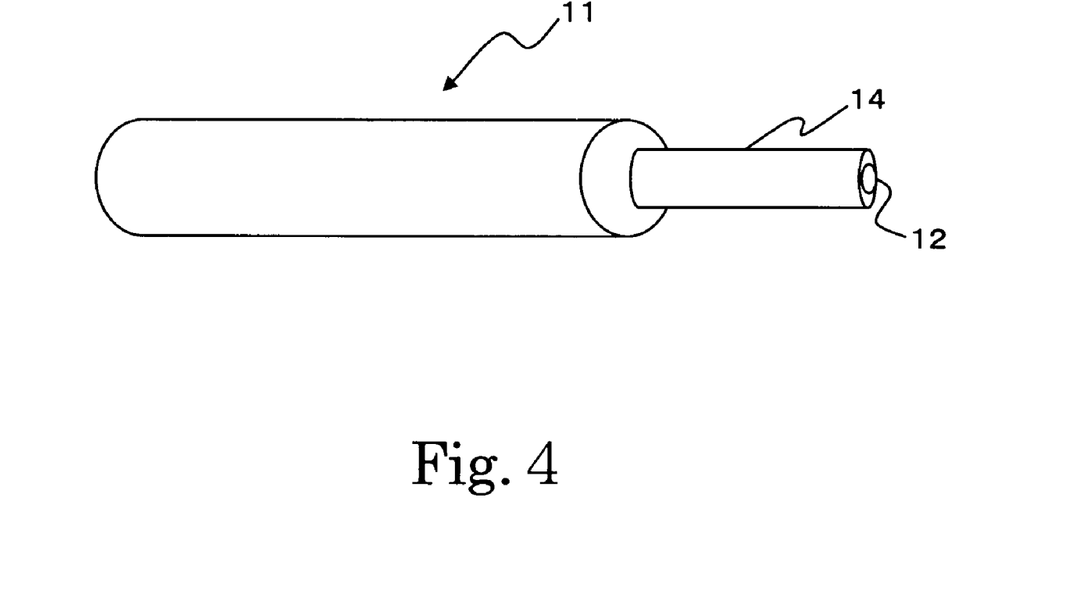
FIG. 4 is a perspective view showing an end portion of the single mode optical fiber shown in FIG. 3 in a state where an outer sheath portion has been removed.

In order to form one end side of the end surface closely arranged multicore optical fiber, the jacket 18 and the buffer layer 16 are removed from the single-mode optical fiber 11 over the distance of 40 mm from the edge thereof, to thereby expose the clad 14, as shown in FIG. 4.

Figure 5:
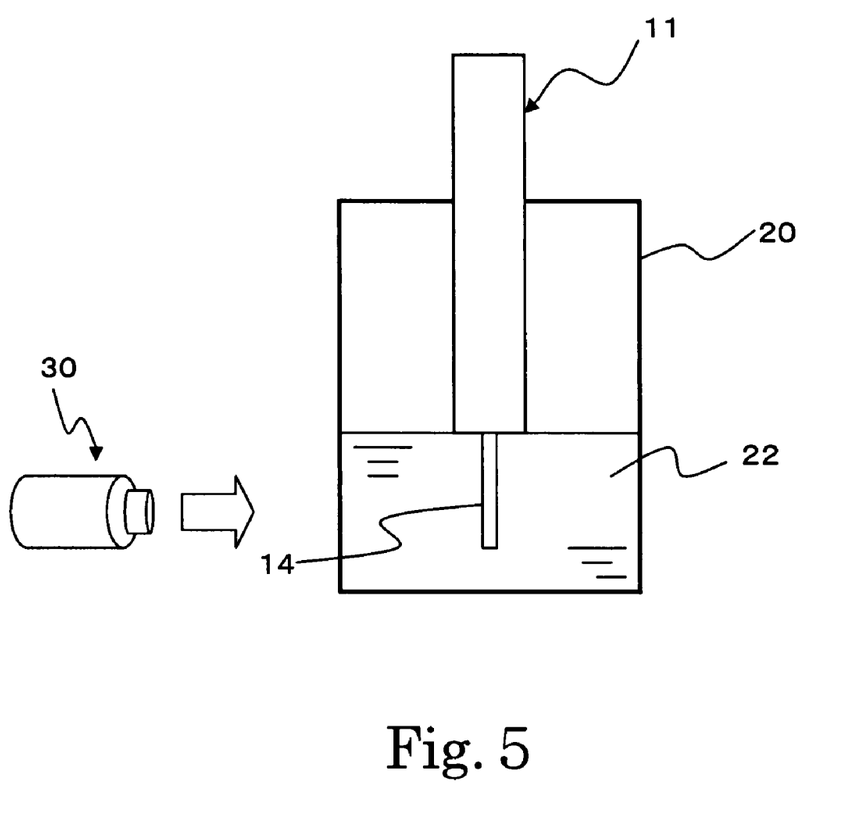
FIG. 5 is a view for explaining an example method of producing a thinned clad.
Figure 6:
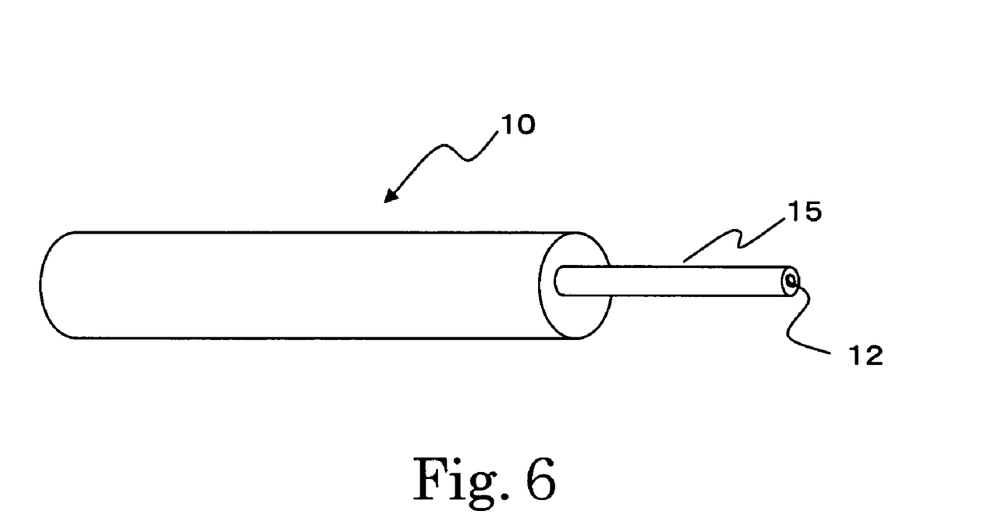
FIG. 6 is a perspective view showing an example of a single-mode optical fiber of the present invention including a thinned clad.

Then, as shown in FIG. 5, in a cylindrical vessel 20 formed of polyethylene, for example, and containing transparent liquid 22 which can exhibit an erosive action with respect to the clad 14, such as a 46% hydrofluoric acid solution, the stripped portion of the clad 14 over the distance of 40 mm from the front edge of the single-mode optical fiber 11 is soaked. Meanwhile, thinning of the clad 14 due to erosion is observed by using a stereoscopic microscope 30 from outside the cylindrical vessel 20, and, when the diameter of the clad 14 is reduced to 39 μm, the single-mode optical fiber 11 is taken out of the cylindrical vessel 20, so that a single-mode optical fiber 10 having a thinned clad 15 with a diameter of 39 μm (approximately 40 μm) as shown in FIG. 6 is produced.

Figure 7:
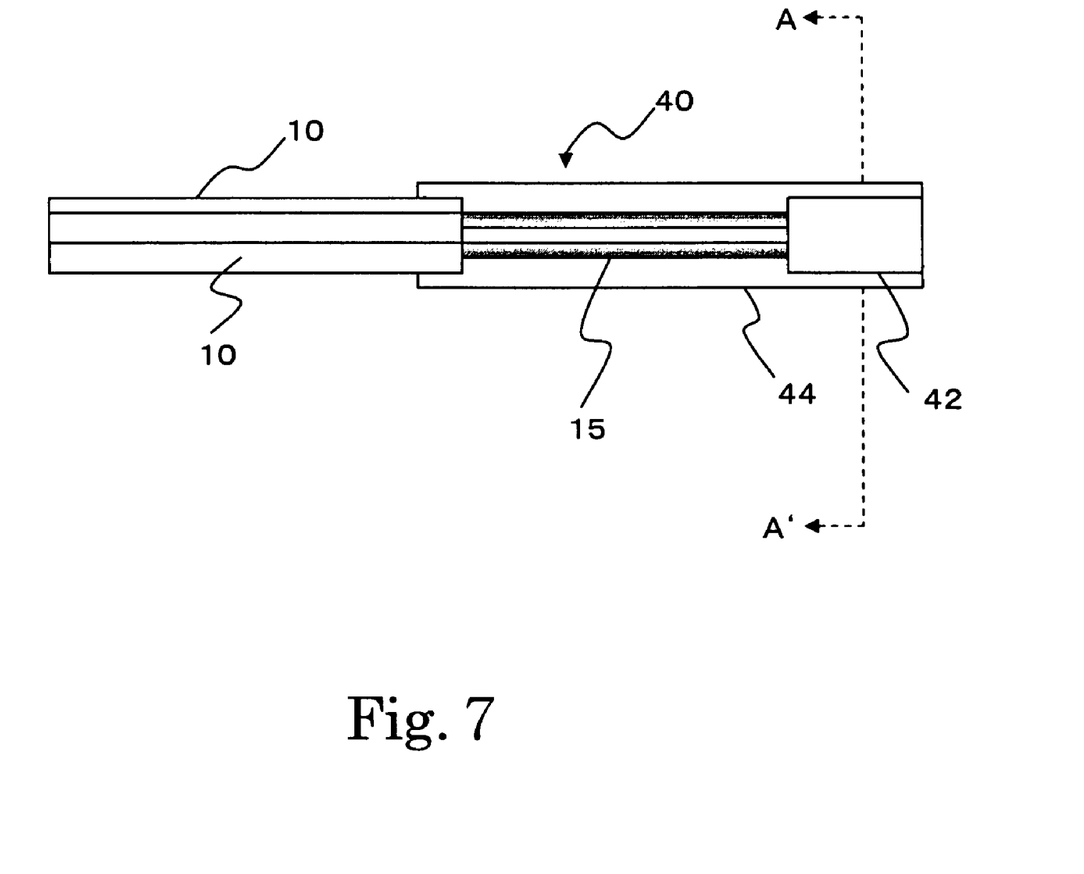
FIG. 7 is a cross sectional view for explaining a structure of the end surface closely arranged multicore optical fiber of the present invention at one end portion.

Seven single-mode optical fibers 10 having such a thinned clad 15 are then produced. End portions of the clad 15 of the seven single-mode optical fibers 10 are inserted into a ceramic capillary 42 having an inner diameter of 0.119 mm, an outer diameter of 1.4 mm, and a length of 3 mm. Further, the ceramic capillary 42, the clad 15, and a portion of the outer periphery of the single-mode optical fiber 10 are protected with a connector 44 having an outer diameter of 6 mm and a length of 50 mm. Here, the ceramic capillary 42 and the connector 44 form a ferrule 40.

FIG. 8 shows a cross section taken along line A-A' of FIG. 7. As shown in FIG. 8, the core/clad optical fibers including the core 12 and the thinned clad 15 surrounding the outer periphery of the core 12 are inserted in the ferrule 40. More specifically, one core/clad optical fiber is inserted in the middle of the ferrule 40, with other six core/clad optical fibers surrounding the one optical fiber along a concentric circle. Then, an adhesive resin 46 is applied to fix the core/clad optical fibers within the ferrule 40. Thereafter, the end portions of the core/clad optical fibers are polished to a mirror-smooth state to thereby produce an end surface closely arranged multicore optical fiber.

While an end surface closely arranged seven-core optical fiber has been described as an example, the present invention is not limited to this structure, and may also be applicable to an end surface closely arranged multicore optical fiber having either odd-number cores or even-number cores.

The core 12 described above is generally formed of a tube made of fused silica. Further, the clad (clad layer) 15 is generally formed on the core 12 by using a method called the "soot" method, for example. Specifically, a gas flow of reactant of precursor including oxygen, a gaseous compound having silicon, and a gaseous compound having a dopant, as required, is passed through a glass tube. With a moving heat source such as flame being passed along the tube, a moving high-temperature zone is created, thereby heating a gas flow portion flowing through the tube and the moving high-temperature zone. The precursor reactant passing through the high-temperature zone is subjected to a uniform reaction, so that glass particles (also referred to as "soot" in the present specification) are formed in a gaseous phase, i.e. without a medium surface. The glass particles are moved by the gas flow and are accumulated on the tube downstream of where they are formed. The soot adhered to the tube is then sintered to form a glass layer on the tube. One or a plurality of partial layers of the clad layer can be formed by a precursor mixture of $SiCl_4$ and $O_2$, for example. Further, the clad layer (or any of the partial layers thereof) can be doped with one or a plurality of the following: phosphorus (by $POCl_3$ precursor), germanium (by $GeCl_4$ precursor), fluorine (by $C_2F_6$, $SF_6$, or $SiF_4$ precursor), boron (by $BCl_3$ precursor), and aluminum (by $AlCl_3$ precursor). Heating can be achieved by using any known movable heat source including an oxygen/hydrogen torch which moves longitudinally along the length of the tube to heat the tube wall to a temperature in the range of approximately 1700° C. to approximately 2350° C.

While the clad 15 having a dopant can be easily thinned due to erosion by the above-described 46% hydrofluoric acid solution, a fluoboric acid solution, a hexafluorophosphate solution, and so on may also be used.

The end surface closely arranged multicore optical fiber and the manufacturing method thereof according to the present invention can be effectively used in the fields of optical communication and optical information processing.

The foregoing description of the exemplary embodiments of the present invention has been provided for the purpose of illustration and description. It is not intended to be exhaustive or to limit the invention to the precise forms disclosed. Obviously, may modifications and variations will be apparent to practitioners skilled in the art. The exemplary embodiments were chosen and described in order to best explain the principles of the invention and its practical application, thereby enabling others skilled in the art to understand the invention for various embodiments and with the various modifications as are suited to the particular use contemplated. It is intended that the scope of the invention be defined by the following claims and their equivalents.

What is claimed is:

1. An end surface closely arranged multicore optical fiber, comprising:

at least two core/clad single-mode optical fibers, including a clad surrounding a core and at one end individual single-mode optical fibers closely arranged in parallel to each other and bound together, with a core diameter being maintained and an outer diameter of the clad being reduced, wherein when at least one end of the end surface closely arranged multicore optical fiber where the single-mode optical fibers are molded, with the clad diameter being reduced, and are converged is to be optically connected with a multimode optical fiber, a distance L between centers of adjacent single-mode optical fibers at the end where the clad diameter is reduced is as follows:

a lower limit distance L is twice the core diameter of the single-mode optical fiber or greater; and D represents the core diameter of the multimode optical fiber, where D is 80 μm or less, d represents the core diameter of the single-mode optical fiber, and n is a number (2, 3, 4, or 7) of the single-mode optical fibers that are bound together, an upper limit L is as follows:

$L \leq D-d$, when $n=2$;

$L \leq \sqrt{3}(D-d)/2$, when $n=3$;

$L \leq \sqrt{2}(D-d)/2$, when $n=4$; and $L \leq (D-d)/2$, when $n=7$, and at the other end of the optical fibers, the individual single-mode optical fibers are individually independent from each other.

2. The end surface closely arranged multicore optical fiber according to claim 1, wherein when signal light is emitted into one single-mode optical fiber disposed at the center of the end surface closely arranged multicore optical fiber and control light is emitted into one of peripheral single-mode optical fibers of the end surface closely arranged multicore optical fiber to thereby perform optical path switching for the signal light, a distance between centers of adjacent single-mode optical fibers at the end where the clad diameter is reduced is twice the core diameter of the single-mode optical fiber or greater and is 40 μm or less.

3. The end surface closely arranged multicore optical fiber according to claim 1, wherein the clad diameter of the single-mode optical fibers is identical at the end where the clad diameter is reduced, and adjacent single-mode optical fibers, in the number M represented by the following equation [1], form a closest-packing structure at the end where the clad diameter is reduced:

$$M = 1 + \sum_{n=1}^{N} 6n \quad [1]$$

where N is an integer of 1 or greater.

4. An end surface closely arranged multicore optical fiber, comprising:

at least two core/clad single-mode optical fibers, including a clad surrounding a core and at one end individual single-mode optical fibers are closely arranged in parallel to each other and bound together, with a core diameter being maintained and an outer diameter of the clad being reduced, wherein when at least one end of the end surface closely arranged multicore optical fiber where the single-mode optical fibers are molded, with the clad diameter being reduced, and are converged is to be optically connected with a multimode optical fiber, a distance L between centers of adjacent single-mode optical fibers at the end where the clad diameter is reduced is as follows:

a lower limit distance L is twice the core diameter of the single-mode optical fiber or greater; and D represents the core diameter of the multimode optical fiber, where D is 80 μm or less, d represents the core diameter of the single-mode optical fiber, and n is a number (2, 3, 4, or 7) of the single-mode optical fibers that are bound together, an upper limit L is as follows:

$L \leq D-d$, when $n=2$;

$L \leq \sqrt{3}(D-d)/2$, when $n=3$;

$L \leq \sqrt{2}(D-d)/2$, when $n=4$; and $L \leq (D-d)/2$, when $n=7$, and at the other end of the optical fibers, some of the individual single-mode optical fibers are closely arranged in parallel to each other and bound together, with a core diameter being maintained and an outer diameter of the clad being reduced, and the remaining individual single-mode optical fibers are individually independent from each other.

5. The end surface closely arranged multicore optical fiber according to claim 4, wherein when signal light is emitted into one single-mode optical fiber disposed at the center of the end surface closely arranged multicore optical fiber and control light is emitted into one of peripheral single-mode optical fibers of the end surface closely arranged multicore optical fiber to thereby perform optical path switching for the signal light, a distance between centers of adjacent single-mode optical fibers at the end where the clad diameter is reduced is twice the core diameter of the single-mode optical fiber or greater, and is 40 μm or less.

6. The end surface closely arranged multicore optical fiber according to claim 4, wherein the clad diameter is identical of the single-mode optical fibers at the end where the clad diameter is reduced, and adjacent single-mode optical fibers, in the number M represented by the following equation [1], form a tightest-packing structure at the end where the clad diameter is reduced:

$$M = 1 + \sum_{n=1}^{N} 6n \quad [1]$$

where N is an integer of 1 or greater.

7. A method of manufacturing an end surface closely arranged multicore optical fiber, comprising:

molding a core/clad single-mode optical fiber including a clad surrounding an outer periphery of a core such that, on at least one end of the optical fiber, a core diameter is maintained and an outer diameter of the clad is reduced, wherein when at least one end of the end surface closely arranged multicore optical fiber where the single-mode optical fibers are molded, with the clad diameter being reduced, and are converged is to be optically connected with a multimode optical fiber, a distance L between centers of adjacent single-mode optical fibers at the end where the clad diameter is reduced is as follows:

a lower limit distance L is twice the core diameter of the single-mode optical fiber or greater; and D represents the core diameter of the multimode optical fiber, where D is 80 μm or less, d represents the core diameter of the single-mode optical fiber, and n is a number (2, 3, 4, or 7) of the single-mode optical fibers that are bound together, an upper limit L is as follows:

$L \leq D-d$, when $n=2$;

$L \leq \sqrt{3}(D-d)/2$, when $n=3$;

$L \leq \sqrt{2}(D-d)/2$, when $n=4$; and $L \leq (D-d)/2$, when $n=7$; and binding a plurality of single-mode optical fibers together at an end where the clad diameter is reduced, and inserted and fixed in a ferrule.

\* \* \* \* \*